(12) United States Patent
Bernard et al.

(10) Patent No.: US 6,897,173 B2
(45) Date of Patent: May 24, 2005

(54) MINERAL WOOL COMPOSITION

(75) Inventors: Jean-Luc Bernard, Clermont (FR); Serge Vignesoult, Paris (FR); Patrice Lehuede, Aubervilliers (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 10/220,292

(22) PCT Filed: Mar. 16, 2001

(86) PCT No.: PCT/FR01/00805

§ 371 (c)(1),
(2), (4) Date: Nov. 21, 2002

(87) PCT Pub. No.: WO01/68546

PCT Pub. Date: Sep. 20, 2001

(65) Prior Publication Data

US 2003/0181306 A1 Sep. 25, 2003

(30) Foreign Application Priority Data

Mar. 17, 2000 (FR) ............................................ 00 03484

(51) Int. Cl.$^7$ ..................... C03C 13/06; C03C 13/00; C03C 3/091

(52) U.S. Cl. ..................... 501/36; 501/35; 501/66; 501/70

(58) Field of Search ................ 501/35, 36, 66, 501/77, 70

(56) References Cited

U.S. PATENT DOCUMENTS

| | | | | |
|---|---|---|---|---|
| 5,932,500 A | * | 8/1999 | Jensen et al. | 501/36 |
| 6,043,170 A | * | 3/2000 | Steinkopf et al. | 501/36 |
| 6,284,684 B1 | * | 9/2001 | Vignesoult et al. | 501/36 |
| 6,458,436 B1 | * | 10/2002 | Hansen et al. | 428/34.5 |

FOREIGN PATENT DOCUMENTS

| | | | |
|---|---|---|---|
| FR | 2 755 684 | 5/1998 | |
| FR | 2 783 516 | 3/2000 | |
| FR | 2783516 A1 | * 3/2000 | ........... C03B/37/04 |
| JP | 02 149453 | 6/1990 | |
| JP | 09 255375 | 9/1997 | |
| WO | 97 20782 | 6/1997 | |
| WO | 97 21636 | 6/1997 | |
| WO | 97 29057 | 8/1997 | |

\* cited by examiner

*Primary Examiner*—Karl Group
*Assistant Examiner*—Elizabeth A. Bolden
(74) *Attorney, Agent, or Firm*—Oblon, Spivak, McClelland, Maier & Neustadt, P.C.

(57) ABSTRACT

Mineral wool capable of dissolving in a physiological medium, and which comprises fibers whose constituents are mentioned below in the following percentages by weight:

Figure 1:
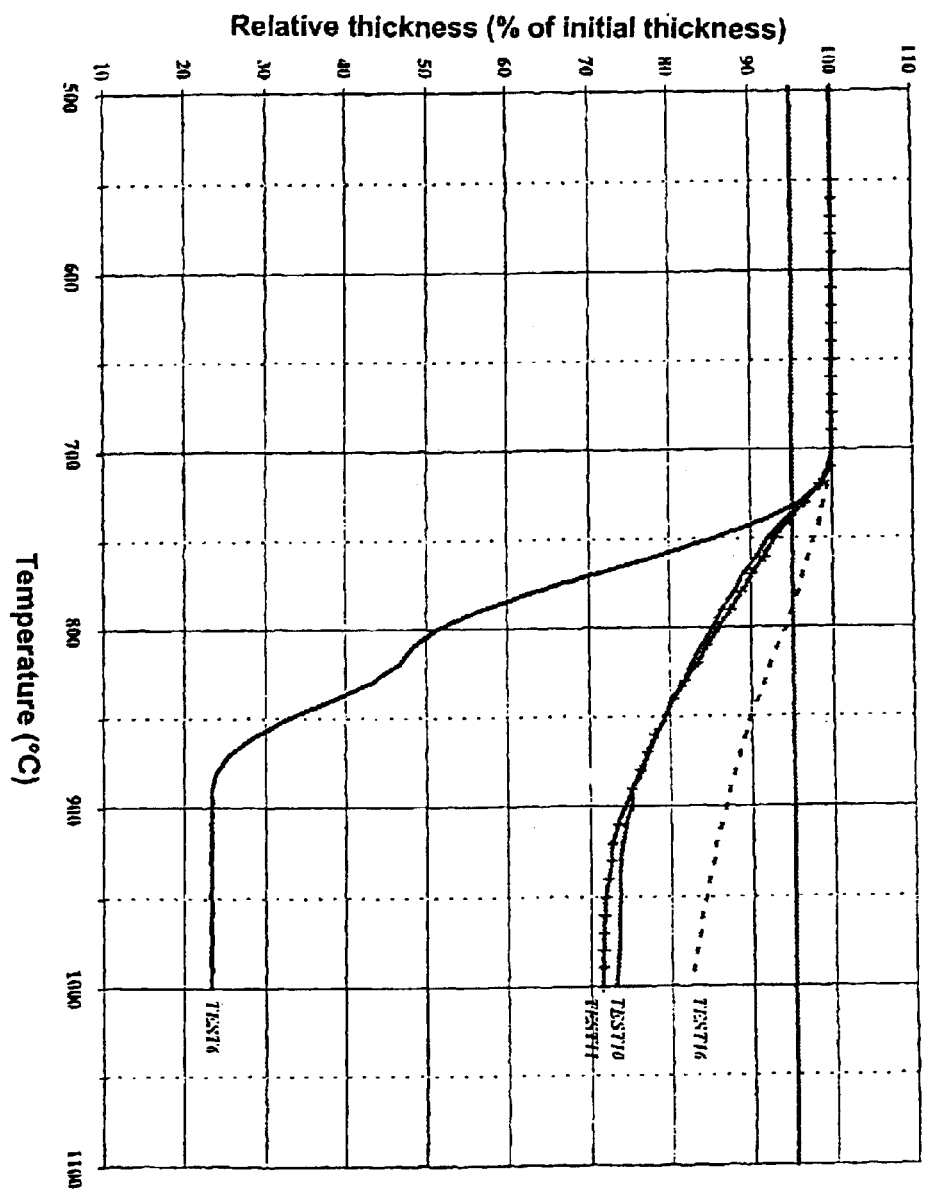

| | | | |
|---|---|---|---|
| $SiO_2$ | 35–60%, | preferably | 39–55% |
| $Al_2O_3$ | 12–27%, | " | 16–25% |
| CaO | 0–35%, | " | 3–25% |
| MgO | 0–30%, | " | 0–15% |
| $Na_2O$ | 0–17%, | " | 6–12% |
| $K_2O$ | 0–17%, | " | 3–12% |
| $R_2O$ ($Na_2O + K_2O$) | 10–17%, | " | 12–17% |
| $P_2O_5$ | 0–5%, | " | 0–2% |
| $Fe_2O_3$ | 0–20%, | | |
| $B_2O_3$ | 0–8%, | " | 0–4% |
| $TiO_2$ | 0–3%, | | | and also comprises a phosphorus compound, the phosphorus content of which, expressed in $P_2O_5$ form, varies from 0.2%, especially from more than 0.5%, to 5%, especially to less than 2%, of the total mass of fibers, which is capable of reacting above 100° C. with the fibers to form a coating on the surface of the fibers.

36 Claims, 1 Drawing Sheet

MINERAL WOOL COMPOSITION

The present invention relates to the field of artificial mineral wools. It is aimed more particularly at mineral wools intended for manufacturing thermal and/or acoustic insulation materials or soilless-culture substrates. It relates in particular to thermally stable mineral wools intended for applications in which the capability of withstanding temperature is important.

These mineral wools are capable of playing an important role in the fire resistance of structural systems into which they have been incorporated.

It concerns more particularly mineral wools of the rock-wool type, that is to say the chemical compositions of which wools involve a high liquidus temperature and a high fluidity at their fiberizing temperature, combined with a high glass transition temperature.

Conventionally, this type of mineral wool is fiberized by processes called "external" centrifuging, for example of the type of those using a cascade of centrifuging wheels fed with molten material by a static delivery device, as described in particular in Patents EP-0,465,310 or EP-0,439,385.

The process called "internal" centrifuging fiberizing, that is to say the process using centrifuges rotating at high speed and drilled with holes, is, on the other hand, conventionally reserved for fiberizing mineral wool of the glass-wool type, schematically having a composition richer in alkali metal oxides and having a low alumina content, a lower liquidus temperature and a higher viscosity at the fiberizing temperature than rock wool. This process is described, in particular, in Patent EP-0,189,354 or Patent EP-0,519,797.

However, technical solutions have recently been developed which make it possible to adapt the internal centrifuging process to the fiberizing of rock wool, especially by modifying the composition of the constituent material of the centrifuges and their operating parameters. For further details on this subject, reference may be made especially to Patent WO 93/02977. This adaptation has proved to be particularly beneficial in the sense that it allows properties which hitherto were only inherent in one or other of the two types of wool—rock wool or glass wool—to be combined. Thus, the rock wool obtained by internal centrifuging has a quality comparable to that of glass wool, with a lower content of unfiberized material than rock wool obtained conventionally. However, it retains the two major advantages associated with its chemical nature, namely a low chemicals cost and a high temperature withstand capability.

There are therefore now two possible ways of fiberizing rock wool, the choice of one or other depending on a number of criteria, including the quality level required for the intended application and the level of industrial and economic feasibility.

To these criteria have in recent years been added that of biodegradability of mineral wool, namely its ability to be rapidly dissolved in a physiological medium, so as to prevent any potential pathogenic risk associated with the possible accumulation of the finest fibres in the body by inhalation.

Furthermore, many mineral wool applications use the remarkable property of thermal stability that certain mineral wool compositions exhibit. In particular, the thermal stability of mineral wools obtained from basalt or from iron-enriched slag, is known.

The drawback of these compositions is, in the case of basalt, its low solubility in a physiological medium and, in the case of iron-enriched slag, its high fiberizing temperature which limits the process for fiberizing these compositions using processes called "external" processes.

One solution to the problem of choosing the composition of a rock-type mineral wool having a biosoluble nature consists in the use of a high content of alumina and moderate alkali contents.

This solution results in particular in high raw materials costs because of the preferred use of bauxite.

The object of the present invention is to improve the chemical composition of rock-type mineral wool fibers, the improvement being aimed especially at increasing their biodegradability with the ability for them to be fiberized especially and advantageously by internal centrifuging, while still maintaining the possibility of obtaining these compositions from inexpensive raw materials and of giving these mineral wools excellent thermal stability.

The expression "thermally stable mineral wool" or "wool exhibiting thermal stability" should be understood to mean a mineral wool capable of exhibiting temperature resistance, that is to say capable of not collapsing when it is heated, especially up to temperatures of at least 1000° C.

In particular, a mineral wool is regarded as being thermally stable if it meets the criteria defined by the draft standard "Insulating materials: Thermal stability" as proposed by NORDTEST (NT FIRE XX—NORDTEST REMISS No.1114-93).

This test defines a procedure for determining the thermal stability of a specimen of insulating material at a temperature of 1000° C. A specimen of insulating material (especially 25 mm in height and 25 mm in diameter) is put into a furnace which allows the collapse of the specimen to be observed as a function of the temperature of the specimen.

The temperature of the furnace is increased from room temperature up to at least 1000° C. at a rate of 5° C. per minute.

This draft standard defines an insulating material as being thermally stable if the specimen of this material does not collapse by more than 50% of its initial thickness until the temperature of 1000° C. has been reached.

The subject of the invention is a mineral wool capable of dissolving in a physiological medium, which comprises fibers whose constituents are mentioned below in the following percentages by weight:

| | | | |
|---|---|---|---|
| $SiO_2$ | 35–60%, | preferably | 39–55% |
| $Al_2O_3$ | 12–27%, | " | 16–25% |
| CaO | 0–35%, | " | 3–25% |
| MgO | 0–30%, | " | 0–15% |
| $Na_2O$ | 0–17%, | " | 6–12% |
| $K_2O$ | 0–17%, | " | 3–12% |
| $R_2O$ ($Na_2O + K_2O$) | 10–17%, | " | 12–17% |
| $P_2O_5$ | 0–5%, | " | 0–2% |
| $Fe_2O_3$ | 0–20%, | | |
| $B_2O_3$ | 0–8%, | " | 0–4% |
| $TiO_2$ | 0–3%, | | | and also comprises a phosphorus compound, the phosphorus content of which, expressed in $P_2O_5$ form, varies from 0.2%, especially from more than 0.5%, to 5%, especially to less than 2%, of the total mass of fibers, which is capable of reacting above 100° C. with the fibers to form a coating on the surface of the fibers.

It has in fact been found that, surprisingly, the fibers, the constituents of which are selected above, react with phosphorus compounds above 100° C. and that this reaction can continue when the temperature is increased. The formation of a coating on the surface of the fibers, especially on fibers that have been heated to temperatures of about 1000° C., is observed.

This coating has the remarkable property of being refractory and thus retards the collapse of a fiber specimen, of the selected composition, heated to temperatures possibly up to 1000° C.

The compound, resulting from the reaction between the fiber constituents and the phosphorus compounds, is rich in phosphorus. Phosphorus contents of between 40 and 60 at % are especially observed in this compound.

The observed coating may be continuous over the surface of a fiber and its thickness is especially between 0.01 and 0.05 $\mu$m. Crystallization of a composition similar to that of the coating may also be observed locally on the surface of the fibers and thicknesses of about 0.1 to 0.5 $\mu$m may be reached.

It is demonstrated that there is a cooperative effect between the fibers, having been the subject of the above selection of constituents, and phosphorus compounds. Thus, mineral wools are obtained which are capable of dissolving in a physiological medium and are thermally stable.

According to a variant of the invention, the mineral wool comprises fibers whose constituents are mentioned below in the following percentages by weight:

| | | | |
|---|---|---|---|
| $SiO_2$ | 39–55%, | preferably | 40–52% |
| $Al_2O_3$ | 16–2%, | " | 16–25% |
| CaO | 3–35%, | " | 10–25% |
| MgO | 0–15%, | " | 0–10% |
| $Na_2O$ | 0–15%, | " | 6–12% |
| $K_2O$ | 0–15%, | " | 3–12% |
| $R_2O$ ($Na_2O + K_2O$) | 10–17%, | | 12–17% |
| $P_2O_5$ | 0–5%, | " | 0–2% |
| $Fe_2O_3$ | 0–15%, | | |
| $B_2O_3$ | 0–8%, | " | 0–4% |
| $TiO_2$ | 0–3%, | | | and when MgO is between 0 and 5%, especially between 0 and 2%, $R_2O \leq 13.0\%$.

According to one advantageous embodiment of the invention, the mineral wool comprises fibers whose constituents are mentioned below in the following percentages by weight:

| | | | |
|---|---|---|---|
| $SiO_2$ | 39–55%, | preferably | 40–52% |
| $Al_2O_3$ | 16–25%, | " | 17–22% |
| CaO | 3–35%, | " | 10–25% |
| MgO | 0–15%, | " | 0–10% |
| $Na_2O$ | 0–15%, | " | 6–12% |
| $K_2O$ | 0–15%, | " | 6–12% |
| $R_2O$ ($Na_2O + K_2O$) | 13.0–17%, | " | |
| $P_2O_5$ | 0–5%, | " | 0–2% |
| $Fe_2O_3$ | 0–15%, | | |
| $B_2O_3$ | 0–8%, | " | 0–4% |
| $TiO_2$ | 0–3%. | | |

In the rest of the text, the word "composition" refers to the ranges of the constituents of the fibers of the mineral wool, or of the glass intended to be fiberized in order to produce said fibers.

In the rest of the text, any percentage of a constituent of the composition should be understood to mean a percentage by weight and the compositions according to the invention may include up to 2 or 3% of compounds to be considered as unanalyzed impurities, as is known in this kind of composition.

The selection of such a composition has allowed a whole raft of advantages to be combined, especially by varying the many and complex roles that a number of these specific constituents play.

It has in fact been possible to show that the combination of a high alumina content, of between 16 and 27%, preferably greater than 17% and/or preferably less than 25%, especially less than 22%, for a sum of network formers—silica and alumina—of between 57 and 75%, preferably greater than 60% and/or preferably less than 72%, especially less than 70%, with a high amount of alkalis ($R_2O$: soda and potash) of between 10 and 17%, with an MgO content of between 0 and 5%, especially between 0 and 2%, when $R_2O \leq 13.0\%$, makes it possible to obtain glass compositions having the remarkable property of being fiberizable over a very wide temperature range and of endowing the fibers obtained with biosolubility at acid pH. Depending on the embodiments of the invention, the alkali content is preferably greater than 12%, especially greater than 13.0% and even 13.3%, and/or preferably less than 15%, especially less than 14.5%.

This range of compositions proves to be particularly beneficial as it has been possible to observe that, contrary to the received opinions, the viscosity of the molten glass does not drop significantly with increasing alkali content. This remarkable effect makes it possible to increase the difference between the temperature corresponding to the viscosity for fiberizing and the liquidus temperature of the phase which crystallizes, and thus to considerably improve the fiberizing conditions, and especially makes it possible to fiberize a new family of biosoluble glasses by internal centrifuging.

According to one embodiment of the invention, the compositions have iron oxide contents of between 0 and 5%, especially greater than 0.5% and/or less than 3%, especially less than 2.5%. Another embodiment is obtained with compositions which have iron oxide contents of between 5 and 12%, especially between 5 and 8%, which may allow mineral-wool blankets to exhibit fire resistance.

Advantageously, the compositions according to the invention satisfy the ratio:

($Na_2O+K_2O$)/$Al_2O_3 \geq 0.5$, preferably ($Na_2O+K_2O$)/$Al_2O_3 \geq 0.6$, especially ($Na_2O+K_2O$)/$Al_2O_3 \geq 0.7$, which appears to favor the obtaining of a temperature corresponding to the viscosity for fiberizing which is greater than the liquidus temperature.

According to a variant of the invention, the compositions according to the invention preferably have a lime content of between 10 and 25%, especially greater than 12%, preferably greater than 15% and/or preferably less than 23%, especially less than 20%, and even less than 17%, combined with a magnesia content of between 0 and 5%, with preferably less than 2% magnesia, especially less than 1% magnesia and/or a magnesia content of greater than 0.3%, especially greater than 0.5%.

According to another variant, the magnesia content is between 5 and 10% for a lime content of between 5 and 15%, and preferably between 5 and 10%.

Adding $P_2O_5$, which is optional, at contents of between 0 and 3%, especially greater than 0.5% and/or less than 2%, may allow the biosolubility at neutral pH to be increased. Optionally, the composition may also contain boron oxide which may allow the thermal properties of the mineral wool to be improved, especially by tending to lower its coefficient of thermal conductivity in the radiative component and also to increase the biosolubility at neutral pH. Optionally, $TiO_2$ may also be included in the composition, for example up to 3%. Other oxides, such as BaO, SrO, MnO, $Cr_2O_3$ and $ZrO_2$, may be present in the composition, each up to contents of approximately 2%.

The difference between the temperature corresponding to a viscosity of $10^{2.5}$ poise (decipascal.second), denoted $T_{log\ 2.5}$, and the liquidus of the crystallizing phase, denoted $T_{liq}$, is preferably at least 10° C. This difference, $T_{log\ 2.5}-T_{liq}$, defines the "working range" of the compositions of the invention, that is to say the range of temperatures within which it is possible to fiberize, most particularly by internal centrifuging. This difference is preferably at least 20 or 30° C., and even more than 50° C., especially more than 100° C.

The compositions according to the invention have high glass transition temperatures, especially greater than 600° C. Their annealing temperature (denoted $T_{annealing}$) is especially greater than 600° C.

As mentioned above, the mineral wools have a satisfactory level of biosolubility, especially at acid pH. Thus, they generally have a rate of dissolution, especially measured with regard to silica, of at least 30 and preferably of at least 40 or 50 ng/cm² per hour measured at pH 4.5.

Another very important advantage of the invention concerns the possibility of using inexpensive raw materials for obtaining the composition of these glasses. These compositions may especially result from the melting of rocks, for example of the phonolite type, with an alkaline-earth carrier, for example limestone or dolomite, if necessary supplemented with iron ore. By this means, an alumina carrier of moderate cost is obtained.

This type of composition, having a high alumina content and a high alkali content, may be advantageously melted in fired or electric glass furnaces.

According to one advantageous embodiment of the invention, the coating capable of forming on the surface of the mineral wool fibers essentially consists of an alkaline-earth phosphate.

Thus, coatings whose composition is similar to that of crystals of the alkaline-earth orthophosphate or pyrophosphate type, the melting point of which is known as being above 1000° C., are obtained.

Advantageously, the alkaline-earth phosphate which is capable of forming on the surface of the mineral wool fibers is a calcium phosphate.

Calcium phosphates, especially the orthophosphate ($Ca_3(PO_4)_2$) and the pyrophosphate ($Ca_2P_2O_7$), are known to be refractory and these compounds have melting points of 1670° C. and 1230° C., respectively.

According to a variant of the invention, the phosphorus compound capable of reacting with the fibers is a compound which decomposes above 100° C., releasing phosphoric acid ($H_3PO_4$, $HPO_3$, etc.) and/or phosphoric anhydride ($P_2O_5$), in solid, liquid or vapor form.

According to a preferred embodiment, the phosphorus compound is chosen from the following compounds:

ammonium salts, ammonium phosphates, especially ammonium hydrogen phosphate (called AHP), ammonium dihydrogen phosphate (called ADP) and polyphosphates (especially of the metaphosphate and pyrophosphate types). These ammonium salts may be pure or may include organic radicals;

phosphoric acid in its various forms, especially orthophosphoric acid ($H_3PO_4$), metaphosphoric acid and polyphosphoric acid ($[HPO_3]_n$);

aluminum hydrogenophosphates, especially aluminum hydrogen phosphate or aluminum dihydrogen phosphate, by themselves or mixed with orthophosphoric acid.

The invention also relates to a process for manufacturing mineral wool in which fibers are essentially formed from molten oxides whose constituents are mentioned below in the following percentages by weight:

| | | | |
|---|---|---|---|
| $SiO_2$ | 35–60%, | preferably | 39–55% |
| $Al_2O_3$ | 12–27%, | " | 16–25% |
| CaO | 0–35%, | " | 3–25% |
| MgO | 0–30%, | " | 0–15% |
| $Na_2O$ | 0–17%, | " | 6–12% |
| $K_2O$ | 0–17%, | " | 3–12% |
| $R_2O$ ($Na_2O + K_2O$) | 10–17%, | " | 12–17% |
| $P_2O_5$ | 0–5%, | " | 0–2% |
| $Fe_2O_3$ | 0–20%, | | |
| $B_2O_3$ | 0–8%, | " | 0–4% |
| $TiO_2$ | 0–3%, | | | and in which a phosphorus compound, capable of reacting with the fibers in order to form a coating on the surface of the fibers, is then applied, especially by spraying or impregnating with a solution.

The invention also relates to the use of the mineral wool described above in fire-resistant structural systems.

The expression "fire-resistant structural systems" is understood to mean systems comprising, in general, assemblies of materials, especially those based on mineral wool and metal sheets or plates, which are capable of effectively retarding the propagation of heat, of providing protection against flames and hot gases and of retaining mechanical strength in a fire.

Standardized tests define the degree of fire resistance, especially expressed as the time needed for a given temperature to reach the opposite side of the structural system subjected to a heat flux, generated for example by the flame of a burner or an electric furnace.

A structural system is regarded as exhibiting satisfactory fire resistance in particular if it can meet the requirements of one of the following tests:

fire door testing: tests on sheets of mineral fibers, as defined in the German Standard DIN 18 089-Part 1;

fire behavior of material and of structural components, as defined in German standard DIN 4102. In particular, German standard DIN 4102-Part 5 for full-scale testing, in order to determine the fire resistance class, and/or German standard DIN 4102-Part 8 for testing specimens on a small test bed are considered;

testing according to the standardized OMI A 754 (18) test, which describes the general requirements of fire resistance tests for "MARINE"-type applications, especially for bulkheads on ships. These tests are carried out on large-sized specimens, in furnaces measuring 3 m by 3 m. Mention may be made, for example, of the case of a steel deck where the required performance in the case of a fire on the insulation side is to meet the thermal insulation criterion for at least 60 minutes.

Further details and advantageous characteristics will become apparent from the description below of nonlimiting preferred embodiments.

Table 1 below gives the chemical compositions, in percentages by weight, of forty-two examples.

When the sum of all the contents of all the compounds is slightly less or slightly greater than 100%, it should be understood that the difference from 100% corresponds to the impurities/minor components that are not analyzed and/or is due only to the approximation accepted in this field in the analytical methods used.

The compositions according to these examples were fiberized by internal centrifuging, especially according to the teaching of the aforementioned patent WO 93/02977.

Their working ranges, defined by the difference $T_{log\ 2.5}-T_{liq}$ are well positive, especially greater than 50° C., or even 100° C., and even greater than 150° C.

All the compositions have a $(Na_2O+K_2O)/Al_2O_3$ ratio greater than 0.5 for a high alumina content of about 16 to 25%, with quite a high $(SiO_2+Al_2O_3)$ sum and an alkali content of at least 10% when MgO is less than or equal to 5% and of at least 13% when MgO is greater than 5%.

The liquidus temperatures are not very high, especially less than or equal to 1200° C. and even 1150° C.

The temperatures corresponding to viscosities of $10^{2.5}$ poise ($T_{log\ 2.5}$) are compatible with the use of high-temperature fiberizing dishes, especially under the operating conditions described in application WO 93/02977.

The preferred compositions are particularly those in which $T_{log\ 2.5}$ is less than 1350° C., preferably less than 1300° C.

It has been observed that, for the compositions comprising between 0 and 5% of magnesia MgO, especially with at least 0.5% MgO and/or less than 2%, or even less than 1%, MgO, and between 10 and 13% of alkalis, very satisfactory results in respect of physical properties, especially working ranges and dissolution rates, are obtained (as in the case of the following examples: Ex. 18, Ex. 31, Ex. 32 and Ex. 33).

To illustrate the present invention, various components were added during the fiberizing process, by spraying them in a zone located after the zone in which the fibers are drawn from the molten glass but before the zone for collecting the mineral wool. The term "additives" refers to the compounds added in this spraying zone.

By way of examples, the four compositions in Table 1, denoted Ex. 4, EX. 33, EX. 41 and EX. 42, were fiberized with and without a phosphorus-based compound in order to obtain mineral wool blankets.

A control glass, the contents of the elements of which lie outside the range selected for the present invention, was also fiberized with and without a phosphorus-based compound. This glass is called "CONTROL" and its composition (in percentages by weight) is as follows:
$SiO_2$: 65%; $Al_2O_3$: 2.1%; $Fe_2O_3$: 0.1%; CaO: 8.1%; MgO: 2.4%; $Na_2O$: 16.4%; $K_2O$: 0.7%; $B_2O_3$: 4.5%.

It should be noted that the additives may include compounds added simultaneously or separately. In the tests below, given in Table II and denoted "TEST", the additive comprises a resin-based binder and for certain examples a phosphorus compound added to this binder and sprayed at the same time as the latter. A test was carried out in the absence of binder, only the phosphorus compound being sprayed (the test referred to as "TEST 14").

The mineral wools obtained were examined and their density ($\rho$, expressed in kg/m$^3$) and their thermal stability were measured. To measure the thermal stability, mineral wool specimens about 25 mm in height and 25 mm in diameter were taken from the mineral wool blanket. The collapse of these specimens was measured in accordance with the procedure defined above under the title "Insulating materials: thermal stability". Table II gives the values of the degree of collapse measured at 1000° C. The term "relative thickness" is understood to mean the residual thickness of the specimen measured at a given temperature with respect to the initial thickness of the specimen (at room temperature). The term "degree of collapse" is the value of (1–"relative thickness") at the given temperature.

Table II gives the results of the tests carried out. The variables measured on the specimens are: the composition of the fibers, the density of the mineral wool ($\rho$) and the additive (type and amount sprayed). The result indicative of the thermal stability, measured and given in Table II, is the degree of collapse at 1000° C.

To illustrate the method of determining the degree of collapse at 1000° C., FIG. 1 shows the measured variation in the relative thickness of mineral wool specimens as a function of temperature from 500° C. to 1000° C. This shows that the specimen labeled "TEST 6" suddenly collapses above 700° C. to 750° C. and that the relative thickness is less than 25% above 880° C. Such a specimen is said to be thermally unstable since its degree of collapse at 1000° C. is about 75%. Unlike this specimen, the specimens corresponding to "TEST 10", "TEST 11" and "TEST 16" in FIG. 1 undergo moderate collapse above 700–750° C., and then their collapse stabilizes around 900° C. They may therefore be said to have a "collapse plateau". These three specimens ("TEST 10", "TEST 11" and "TEST 16") have a degree of collapse of 26%, 28% and 18%, respectively. Since these degrees of collapse are less than 50%, the mineral wools from which the specimens were taken are termed thermally stable.

The additives added in the spraying zone are of two kinds:
resin-based binders, well known in the mineral wool field. The function of these binders is to give the mineral wool blanket the desired mechanical strength. Two binders were studied for the present trials: a binder based on a phenol-formaldehyde resin with urea (standard binder) with reference D in Table II and a melamine-based binder with reference E in Table II, and known for providing thermal stability advantages;

phosphorus compounds, the advantage of which for favoring or increasing the thermal stability of mineral wools consisting of fibers of the composition according to the invention will be demonstrated.

The phosphorus compounds presented in Table II are three in number:
a nonpermanent fire retardant known by the brand name "FLAMMETIN UCR-N" and produced by Thor Chemie. This compound has the reference B in table II. This product is used for fireproofing cotton-, cellulose- and polyester-based textiles. It comprises ammonium phosphates. The amount of phosphorus, expressed in $P_2O_5$, form, of this product may be estimated to be about 40% of the mass of the product;

a fire retardant known by the brand name "FLAMMENTIN TL 861-1" and produced by Thor Chemie. This compound has the reference A in Table II. This product consists of a mixture of around 30 to 40% of FLAMMENTIN UCR-N (A) and an organic compound (especially of the acrylic type). The amount of phosphorus, expressed in $P_2O_5$ form, is around 15 to 20% of the mass of the product. These two products, A and B, are intended for textile applications and also include blowing agents, desiccants (and, in very small quantities, wetting agents, dispersants, setting agents, softeners and enzymes). They constitute intumescent formulations, especially due to the formation of a protective foam layer;

a phosphorus compound with reference C in Table II, namely ammonium dihydrogen phosphate (denoted by "ADP"). This compound contributes about 55% by weight of phosphorus, expressed as $P_2O_5$.

The results given in Table II demonstrate that:
the addition of a phosphorus compound, the phosphorus content, expressed as $P_2O_5$, of which is between 0.2 and 5%, makes it possible to obtain thermally stable mineral wools whose fiber composition corresponds to the range of contents selected for the present invention;

a mineral wool whose fiber composition does not lie within the selected range is not thermally stable, even with the addition of a phosphorus compound within the contents according to the invention (see "TEST 2");

the degree of collapse at 1000° C. of the mineral wool comprising fibers according to the invention decreases as the amount of $P_2O_5$ increases. However, the effect of the phosphorus compound is very significant even at low $P_2O_5$ contents: the amount of $P_2O_5$ is around 0.5% in the case of the "TEST 12" test and around 0.8% in the case of the "TEST 9", "TEST 13" and "TEST 26" tests. It should also be noted that the effect of the phosphorus reaches a threshold at around 2 to 3% $P_2O_5$ (compare "TEST 19" with "TEST 20");

the binder has very little effect on the thermal stability of mineral wools according to the invention and excellent results are obtained even with no binder ("TEST 14").

Among the advantages of the invention is the possibility of using a very simple phosphorus compound, which is distinguished from intumescent compositions. A very significant cost advantage is thus obtained and it is necessary to handle a much smaller amount of material. Furthermore, it has been demonstrated that phosphorus compounds which decompose easily in phosphoric acid are miscible with the binders conventionally used in the mineral wool industry, thus making it possible to simultaneously spray a binder and the phosphorus compound capable of reacting with the glass fibers according to the invention.

The mineral wool specimens obtained after the thermal stability test, i.e. after they have reached a temperature of 1000° C., were examined.

It was noticed that the fibers of the mineral wool specimens according to the invention were relatively well preserved and that they had not melted.

Observations using microanalytical techniques, especially scanning electron microscopy with elemental analysis (by EDX) and an ion probe (SIMS) have demonstrated that there is an almost continuous coating on the surface of the fibers. Typically, this coating has a thickness of 0.01 to 0.05 μm. Its composition is essentially based on phosphorus and calcium. The presence of magnesium and/or iron was noted in some of the specimens.

Fibers sampled after a temperature rise up to 600° C. were also found to have a coating of the same type as that existing at temperatures below 1000° C.

Without wishing to be tied to one scientific theory, it is conceivable that the phosphorus compound releases, especially above 100° C., phosphoric acid and/or phosphoric anhydride which starts to react with the fibers of the composition according to the invention. In the case of these compositions, their high alkali content may play a role in compensating for the charge of aluminum, also present in high amounts. The atomic mobility of alkaline-earth elements in the compositions would thus be higher than that of these elements in other glass compositions. These relatively mobile alkaline-earth elements would then be capable of reacting with the phosphoric acid or phosphoric anhydride, to form a refractory compound, especially an alkaline-earth phosphate, and would thus provide the mineral wools according to the invention with excellent thermal stability.

Advantageously, the mineral wools according to the invention are suitable for all the usual applications of glass wool and rock wool.

TABLE I

| | EX. 1 | EX. 2 | EX. 3 | EX. 4 | EX. 5 | EX. 6 | EX. 7 | EX. 8 | EX. 9 |
|---|---|---|---|---|---|---|---|---|---|
| $SiO_2$ | 47.7 | 42.6 | 44.4 | 45.2 | 45.4 | 43.9 | 44.2 | 43.8 | 46.1 |
| $Al_2O_3$ | 18.6 | 18.1 | 17.3 | 17.2 | 18.1 | 17.6 | 17.6 | 17.6 | 17.4 |
| CaO | 6.2 | 22.7 | 21.7 | 15.3 | 13.5 | 15 | 13.3 | 14.2 | 13.2 |
| MgO | 7.1 | 0.2 | 0.4 | 0.5 | 0.5 | 0.5 | 0.5 | 0.5 | 0.5 |
| $Na_2O$ | 8.0 | 6.3 | 6.0 | 6.2 | 6.5 | 6.40 | 6.3 | 6.4 | 6.3 |
| $K_2O$ | 5.2 | 7.4 | 7.1 | 7.8 | 8.1 | 7.6 | 7.9 | 7.9 | 7.8 |
| $Fe_2O_3$ | 7.2 | 2.5 | 3 | 6.6 | 7.3 | 8.4 | 9.8 | 9.2 | 8.3 |
| TOTAL | 100 | 99.8 | 99.9 | 98.8 | 99.4 | 99.4 | 99.6 | 99.6 | 99.6 |
| $SiO_2 + Al_2O_3$ | 66.3 | 60.7 | 61.7 | 62.4 | 63.5 | 61.5 | 61.8 | 61.4 | 63.5 |
| $Na_2O + K_2O$ | 13.2 | 13.7 | 13.1 | 14 | 14.6 | 14.2 | 14.2 | 14.3 | 14.1 |
| $(Na_2O + K_2O)/Al_2O_3$ | 0.71 | 0.76 | 0.76 | 0.81 | 0.81 | 0.81 | 0.81 | 0.81 | 0.81 |
| $T_{log\ 2.5}$ (in ° C.) | 1293 | 1239 | 1230 | 1248 | 1280 | 1270 | 1285 | 1275 | 1310 |
| $T_{liq}$ (in ° C.) | 1260 | 1200 | 1190 | 1160 | 1160 | 1120 | 1100 | 1110 | 1140 |
| $T_{log\ 2.5} - T_{liq}$ (in ° C.) | +33 | +39 | +40 | +88 | +120 | 150 | 185 | 165 | 170 |
| $T_{annealing}$ (in ° C.) | 622 | 658 | | 634 | 631 | 618 | | | |
| Dissolution rate at pH = 4.5 (in $ng/cm^2$ per h) | ≧30 | ≧30 | ≧30 | 107 | 107 | 45 | ≧30 | ≧30 | ≧30 |

| | EX. 10 | EX. 11 | EX. 12 | EX. 13 | EX. 14 | EX. 15 | EX. 16 | EX. 17 | EX. 18 | EX. 19 | EX. 20 | EX. 21 |
|---|---|---|---|---|---|---|---|---|---|---|---|---|
| $SiO_2$ | 43.8 | 47.1 | 41.9 | 48.2 | 43.2 | 46.3 | 45.4 | 43 | 44.3 | 43 | 47.7 | 45.6 |
| $Al_2O_3$ | 17.6 | 15.7 | 20.9 | 19.8 | 22.5 | 19.3 | 18.8 | 19.7 | 19.8 | 21.5 | 18.4 | 22.4 |
| CaO | 11.9 | 9.8 | 14.5 | 14 | 14.3 | 13.9 | 13.9 | 14.1 | 13.4 | 14.1 | 13.8 | 13.9 |
| MgO | 0.5 | 0.4 | 0.5 | 0.5 | 0.5 | 0.5 | 0.5 | 0.5 | 0.7 | 0.5 | 0.5 | 0.5 |
| $Na_2O$ | 6.4 | 6.4 | 6.1 | 6 | 6 | 6 | 5.9 | 6 | 8.3 | 6 | 6 | 6 |
| $K_2O$ | 8.0 | 8.0 | 7.4 | 7.2 | 7.1 | 7.1 | 7.2 | 7.2 | 3.7 | 7.3 | 7.3 | 7.3 |
| $Fe_2O_3$ | 11.3 | 12.1 | 8.7 | 4.2 | 6.3 | 6.8 | 8.3 | 9.5 | 9.3 | 7.5 | 6.2 | 4.2 |
| TOTAL | 99.6 | 99.5 | 100 | 99.9 | 99.9 | 99.9 | 100 | 100 | 99.5 | 99.9 | 99.9 | 99.9 |
| $SiO_2 + Al_2O_3$ | 61.4 | 62.8 | 62.8 | 68 | 65.7 | 65.6 | 64.2 | 62.7 | 63.8 | 64.5 | 66.1 | 68 |
| $Na_2O + K_2O$ | 14.4 | 14.4 | 13.5 | 13.2 | 13.1 | 13.1 | 13.1 | 13.2 | 12 | 13.3 | 13.3 | 13.3 |
| $(Na_2O + K_2O)/Al_2O_3$ | 0.81 | 0.92 | 0.65 | 0.67 | 0.58 | 0.66 | 0.7 | 0.67 | 0.61 | 0.62 | 0.72 | 0.59 |
| $T_{log\ 2.5+}$ (in ° C.) | 1295 | 1305 | 1300 | 1380 | 1345 | 1335 | 1315 | 1305 | 1250 | 1325 | 1345 | 1370 |
| $T_{liq}$ (in ° C.) | 1160 | 1200 | 1140 | 1160 | 1140 | 1110 | 1110 | 1110 | 1170 | 1140 | 1150 | 1150 |
| $T_{log\ 2.5} - T_{liq}$ (in ° C.) | 135 | 105 | 160 | 220 | 205 | 225 | 205 | 195 | 80 | 175 | 195 | 220 |

TABLE I-continued

| | | | | | | | | | | | | |
|---|---|---|---|---|---|---|---|---|---|---|---|---|
| $T_{annealing}$ (in °C.) | 615 | 616 | 635 | 654 | 655 | 645 | 637 | 638 | | 644 | 645 | 658 |
| Dissolution rate at pH = 4.5 (in ng/cm² per h) | 60 | ≧30 | ≧30 | ≧30 | ≧30 | ≧30 | ≧30 | ≧30 | ≧30 | ≧30 | ≧30 | ≧30 |

| | EX. 22 | EX. 23 | EX. 24 | EX. 25 | EX. 26 | EX. 27 | EX. 28 | EX. 29 | EX. 30 | EX. 31 | EX. 32 | EX. 33 |
|---|---|---|---|---|---|---|---|---|---|---|---|---|
| $SiO_2$ | 43.5 | 43.1 | 40.3 | 42.3 | 43.9 | 41.5 | 39.3 | 47.3 | 45.3 | 45.3 | 44 | 46.5 |
| $Al_2O_3$ | 21.2 | 22.2 | 25.1 | 21.7 | 24.6 | 24.7 | 24.9 | 18.2 | 19.2 | 20.5 | 22.5 | 19.2 |
| CaO | 14.1 | 14 | 13.9 | 13.1 | 13.2 | 13.4 | 13.3 | 13.9 | 12.9 | 12.9 | 12.7 | 12.4 |
| MgO | 0.5 | 0.5 | 0.5 | 0.6 | 0.6 | 0.6 | 0.5 | 0.6 | 0.8 | 0.8 | 0.8 | 0.8 |
| $Na_2O$ | 6 | 6 | 6 | 5.9 | 5.9 | 6.2 | 6.3 | 8.1 | 7.9 | 8.3 | 7.9 | 8.8 |
| $K_2O$ | 7.2 | 7.2 | 7.2 | 7.7 | 7.6 | 7.6 | 7.6 | 3.9 | 5.7 | 3.8 | 3.7 | 3.9 |
| $Fe_2O_3$ | 7.4 | 6.9 | 6.9 | 8.7 | 4 | 6 | 8.1 | 7.5 | 7.5 | 7.4 | 7.5 | 7.4 |
| TOTAL | 99.9 | 99.9 | 99.9 | 100 | 99.8 | 100 | 100 | 99.5 | 99.3 | 99 | 99.1 | 99 |
| $SiO_2 + Al_2O_3$ | 64.7 | 65.3 | 65.4 | 64.0 | 68.5 | 66.2 | 64.2 | 65.5 | 64.5 | 65.8 | 66.5 | 65.7 |
| $Na_2O + K_2O$ | 13.2 | 13.2 | 13.2 | 13.6 | 13.5 | 12.8 | 13.9 | 11.9 | 13.6 | 12.1 | 11.6 | 12.7 |
| $(Na_2O + K_2O)/Al_2O_3$ | 0.62 | 0.59 | 0.53 | 0.63 | 0.55 | 0.52 | 0.56 | 0.65 | 0.7 | 0.59 | 0.52 | 0.66 |
| $T_{log\ 2.5+}$ (in °C.) | 1325 | 1335 | 1330 | 1300 | 1370 | 1330 | 1295 | 1270 | 1270 | 1280 | 1285 | 1280 |
| $T_{liq}$ (in °C.) | 1120 | 1160 | 1170 | 1160 | | 1180 | 1200 | 1160 | 1150 | 1180 | 1200 | 1150 |
| $T_{log\ 2.5} - T_{liq}$ (in °C.) | 205 | 175 | 160 | 140 | | 150 | 95 | 110 | 120 | 100 | 85 | 130 |
| $T_{annealing}$ (in °C.) | 644 | 650 | 652 | | | | | | 625 | | | 618 |
| Dissolution rate at pH = 4.5 (in ng/cm² per h) | ≧30 | ≧30 | ≧30 | ≧30 | ≧30 | ≧30 | ≧30 | ≧30 | ≧30 | ≧30 | ≧30 | ≧30 |

| | EX. 34 | EX. 35 | EX. 36 | EX. 37 | EX. 38 | EX. 39 | EX. 40 | EX. 41 | EX. 42 |
|---|---|---|---|---|---|---|---|---|---|
| $SiO_2$ | 46.5 | 47.7 | 46.5 | 48.0 | 47.1 | 46 | 46 | 43 | 46.3 |
| $Al_2O_3$ | 19.5 | 18.9 | 19.5 | 19.2 | 21 | 20.5 | 20.1 | 23.3 | 18.8 |
| CaO | 11.5 | 13.6 | 14.4 | 13.6 | 12.6 | 11.6 | 14.4 | 15.7 | 10.1 |
| MgO | 0.7 | 1.4 | 1.4 | 0.7 | 0.7 | 0.7 | 1.1 | 0.2 | 3.5 |
| $Na_2O$ | 8.4 | 7.4 | 7.3 | 7.4 | 7.2 | 7.4 | 7.1 | 7.2 | 8 |
| $K_2O$ | 5 | 5 | 5 | 5 | 5 | 5 | 5 | 4.9 | 5 |
| $Fe_2O_3$ | 7.5 | 4.8 | 4.9 | 4.9 | 4.9 | 7.3 | 4.9 | 4.9 | 7.7 |
| TOTAL | 99.1 | 98.8 | 99 | 98.8 | 98.5 | 98.5 | 98.6 | 99.2 | 99.4 |
| $SiO_2 + Al_2O_3$ | 66 | 66.6 | 66.0 | 67.2 | 68.1 | 66.5 | 66.1 | 66.3 | 65.1 |
| $Na_2O + K_2O$ | 13.4 | 12.4 | 12.3 | 12.4 | 12.2 | 12.4 | 12.1 | 12.1 | 13 |
| $(Na_2O + K_2O)/Al_2O_3$ | 0.69 | 0.66 | 0.63 | 0.6 | 0.6 | 0.6 | 0.6 | 0.52 | 0.69 |
| $T_{log\ 2.5+}$ (in °C.) | 1295 | 1310 | 1295 | 1315 | 1340 | 1320 | 1300 | 1290 | 1300 |
| $T_{liq}$ (in °C.) | 1170 | 1140 | 1150 | 1120 | 1110 | 1120 | 1140 | 1140 | 1160 |
| $T_{log\ 2.5} - T_{liq}$ (in °C.) | 125 | 170 | 145 | 195 | 230 | 200 | 160 | 150 | 140 |
| $T_{annealing}$ (in °C.) | 619 | 636 | 636 | 640 | 643 | 633 | 641 | 658 | |
| Dissolution rate at pH = 4.5 (in ng/cm² per h) | ≧30 | ≧30 | ≧30 | ≧30 | ≧30 | ≧30 | ≧30 | ≧30 | |

TABLE II

| TEST | Fiber composition | Density of the mineral wool ρ (kg/m³) | Additive (in % by weight of wool) | | | | | Degree of collapse at 1000° C. (as % of the initial thickness) |
|---|---|---|---|---|---|---|---|---|
| | | | Phosphorus compound | | | Binder | | |
| | | | A | B | C | D | E | |
| TEST 1 | CONTROL | 44 | 0 | 0 | 0 | 2.5 | 0 | 90 |
| TEST 2 | CONTROL | 41 | 0 | 0 | 3 | 2.5 | 0 | 85 |
| TEST 3 | EX. 4 | 48 | 0 | 0 | 0 | 1.5 | 0 | 79 |
| TEST 4 | EX. 4 | 48 | 4 | 0 | 0 | 1.5 | 0 | 40 |
| TEST 5 | EX. 33 | 38 | 0 | 0 | 0 | 1.5 | 0 | 79 |
| TEST 6 | EX. 33 | 47 | 0 | 0 | 0 | 2.5 | 0 | 77 |
| TEST 7 | EX. 33 | 51 | 0 | 0 | 0 | 1.5 | 0 | 72 |
| TEST 8 | EX. 33 | 66 | 0 | 0 | 0 | 1.5 | 0 | 71 |
| TEST 9 | EX. 33 | 42 | 3 | 0 | 0 | 2.5 | 0 | 37 |
| TEST 10 | EX. 33 | 42 | 4.4 | 0 | 0 | 2.5 | 0 | 26 |
| TEST 11 | EX. 33 | 42 | 0 | 3 | 0 | 2.5 | 0 | 28 |
| TEST 12 | EX. 33 | 52 | 0 | 0 | 1 | 2.5 | 0 | 35 |
| TEST 13 | EX. 33 | 80 | 0 | 0 | 1.5 | 2.5 | 0 | 26 |
| TEST 14 | EX. 33 | 65 | 0 | 0 | 3 | 0 | 0 | 17 |
| TEST 15 | EX. 33 | 33 | 0 | 0 | 3 | 1.5 | 0 | 35 |
| TEST 16 | EX. 33 | 44 | 0 | 0 | 3 | 2.5 | 0 | 18 |
| TEST 17 | EX. 33 | 76 | 0 | 0 | 3 | 1.5 | 0 | 17 |
| TEST 18 | EX. 33 | 91 | 0 | 0 | 3 | 1.5 | 0 | 17 |

TABLE II-continued

| TEST | Fiber composition | Density of the mineral wool ρ (kg/m³) | Additive (in % by weight of wool) | | | | | Degree of collapse at 1000° C. (as % of the initial thickness) |
|---|---|---|---|---|---|---|---|---|
| | | | Phosphorus compound | | | Binder | | |
| | | | A | B | C | D | E | |
| TEST 19 | EX. 33 | 90 | 0 | 0 | 5 | 1.5 | 0 | 15 |
| TEST 20 | EX. 33 | 100 | 0 | 0 | 5 | 1.5 | 0 | 14 |
| TEST 21 | EX. 41 | 63 | 0 | 0 | 0 | 1.6 | 0 | 72 |
| TEST 22 | EX. 41 | 48 | 0 | 0 | 0 | 0 | 1.6 | 77 |
| TEST 23 | EX. 41 | 56 | 0 | 0 | 3 | 1.6 | 0 | 22 |
| TEST 24 | EX. 41 | 57 | 0 | 0 | 3 | 0 | 1.6 | 20 |
| TEST 25 | EX. 42 | 90 | 0 | 0 | 0 | 2.5 | 0 | 48 |
| TEST 26 | EX. 42 | 110 | 0 | 0 | 1.5 | 2.5 | 0 | 33 |

What is claimed is:

1. A thermally stable mineral wool capable of dissolving in a physiological medium, said mineral wool comprising fibers comprising:
   $SiO_2$ in an amount of from 35 to 60%,
   $Al_2O_3$ in an amount of from 12 to 27%,
   CaO in an amount of from 0 to 35%,
   MgO in an amount of from 0 to 30%,
   $Na_2O$ in an amount of from 0 to 17%,
   $K_2O$ in an amount of from 0 to 17%,
   $R_2O$ ($Na_2O+K_2$) in an amount of from 10 to 17%,
   $P_2O_5$ in an amount of from 0 to 5%,
   $Fe_2O_3$ in an amount of from 0 to 20%,
   $B_2O_3$ in an amount of from 0 to 8%, and
   $TiO_2$ in an amount of from 0 to 3%,
   wherein % is percent by weight,
   wherein a phosphorus compound is present, said phosphorous compound having a phosphorus content, expressed in $P_2O_5$ form, from 0.2% to 5% of the total mass of fibers, wherein said phosphorous compound is capable of reacting above 100° C. with the fibers, to form a coating on the surface of the fibers.

2. The mineral wool as claimed in claim 1, wherein
   $SiO_2$ is present in an amount of from 39 to 55%,
   $Al_2O_3$ is present in an amount of from 16 to 27%,
   CaO is present in an amount of from 3 to 35%,
   MgO is present in an amount of from 0 to 15%,
   $Na_2O$ is present in an amount of from 0 to 15%,
   $K_2O$ is present in an amount of from 0 to 15%,
   $R_2O$ ($Na_2O+K_2O$) is present in an amount of from 10 to 17%,
   $P_2O_5$ is present in an amount of from 0 to 5%,
   $Fe_2O_3$ is present in an amount of from 0 to 15%,
   $B_2O_3$ is present in an amount of from 0 to 8%, and
   $TiO_2$ is present in an amount of from 0 to 3%,
and further wherein MgO is present in an amount of between 0 and 5% when $R_2O \leq 13.0\%$.

3. The mineral wool as claimed in claim 1, wherein
   $SiO_2$ is present in an amount of from 39 to 55%,
   $Al_2O_3$ is present in an amount of from 16 to 25%,
   CaO is present in an amount of from 3 to 35%,
   MgO is present in an amount of from 0 to 15%,
   $Na_2O$ is present in an amount of from 0 to 15%,
   $K_2O$ is present in an amount of from 0 to 15%,
   $R_2O$ ($Na_2O+K_2O$) is present in an amount of from 13.0 to 17%,
   $P_2O_5$ is present in an amount of from 0 to 5%,
   $Fe_2O_3$ is present in an amount of from 0 to 15%,
   $B_2O_3$ is present in an amount of from 0 to 8%, and
   $TiO_2$ is present in an amount of from 0 to 3%.

4. The mineral wool as claimed in claim 1, wherein the alkali content $R_2O$ ($Na_2O+K_2O$) of the fibers is
   $13.0\% \leq R_2O \leq 15\%$.

5. The mineral wool as claimed in claim 1, wherein the $Fe_2O_3$ (total iron) content of the fibers is
   $0\% \leq Fe_2O_3 \leq 5\%$.

6. The mineral wool as claimed in claim 1, wherein the $Fe_2O_3$ (total iron) content of the fibers is
   $5\% \leq Fe_2O_3 \leq 15\%$.

7. The mineral wool as claimed in claim 1, wherein $(Na_2O+K_2O)/Al_2O_3 \geq 0.5$.

8. The mineral wool as claimed in claim 1, wherein $(Na_2O+K_2O)/Al_2O_3 \geq 0.6$.

9. The mineral wool as claimed in claim 1, wherein CaO and MgO satisfy the following relationship:
   $10\% \leq CaO \leq 25\%$
   and $0\% \leq MgO \leq 5\%$.

10. The mineral wool as claimed in claim 1, wherein:
    $5\% \leq MgO \leq 10\%$ and $5\% \leq CaO \leq 15\%$.

11. The mineral wool as claimed in claim 1, wherein the fibers have a dissolution rate of at least 30 ng/cm² per hour measured at a pH of 4.5.

12. The mineral wool as claimed in claim 1, wherein the fibers comprise glass and said glass may be fiberized by internal centrifuging.

13. The mineral wool as claimed in claim 1, wherein the coating capable of forming on the surface of the fibers consists essentially of an alkaline-earth phosphate.

14. The mineral wool as claimed in claim 13, wherein the alkaline-earth phosphate is a calcium phosphate.

15. The mineral wool as claimed in claim 1, wherein the phosphorus compound capable of reacting with the fibers is a compound which decomposes above 100° C., releasing phosphoric acid or phosphoric anhydride.

16. The mineral wool as claimed in claim 15, wherein the phosphorus compound is chosen from the group consisting of ammonium phosphates, phosphoric acid and ammonium hydrogenophosphates.

17. The mineral wool as claimed in claim 1, wherein
   $SiO_2$ is present in an amount of from 39 to 55%,
   $Al_2O_3$ is present in an amount of from 16 to 25%,
   CaO is present in an amount of from 3 to 25%,
   MgO is present in an amount of from 0 to 15%,
   $Na_2O$ is present in an amount of from 6 to 12%, $K_2O$ is present in an amount of from 3 to 12%, $R_2O$ ($Na_2O+K_2O$) is present in an amount of from 12 to 17%, $P_2O_5$ is present in an amount of from 0 to 2%, and $B_2O_3$ is present in an amount of from 0 to 4%.

18. The mineral wool as claimed in claim 1, wherein the phosphorous content of the phosphorous compound is from 0.5% to less than 2%.

19. The mineral wool as claimed in claim 2, wherein $SiO_2$ is present in an amount of from 40 to 52%, $Al_2O_3$ is present in an amount of from 16 to 25%, CaO is present in an amount of from 10 to 25%, MgO is present in an amount of from 0 to 10%, $Na_2O$ is present in an amount of from 6 to 12%, $K_2O$ is present in an amount of from 3 to 12%, $R_2O$ ($Na_2O+K_2O$) is present in an amount of from 12 to 17%, $P_2O_5$ is present in an amount of from 0 to 2%, and $B_2O_3$ is present in an amount of from 0 to 4%.

20. The mineral wool as claimed in claim 2, wherein MgO is present in an amount of between 0 and 2% when $R_2O$ is $\leq 13.0\%$.

21. The mineral wool as claimed in claim 3, wherein $SiO_2$ is present in an amount of from 40 to 52%, $Al_2O_3$ is present in an amount of from 17 to 22%, CaO is present in an amount of from 10 to 25%, MgO is present in an amount of from 0 to 10%, $Na_2O$ is present in an amount of from 6 to 12%, $K_2O$ is present in an amount of from 6 to 12%, $P_2O_5$ is present in an amount of from 0 to 2%, and $B_2O_3$ is present in an amount of from 0 to 4%.

22. The mineral wool as claimed in claim 4, wherein the alkali content $R_2O$ ($Na_2O+K_2O$) is $13.3\% \leq R_2O \leq 14.5\%$.

23. The mineral wool as claimed in claim 5, wherein the $Fe_2O_3$ content is $0\% \leq Fe_2O_3 \leq 3\%$.

24. The mineral wool as claimed in claim 5, wherein the $Fe_2O_3$ content is $0.5\% \leq Fe_2O_3 \leq 2.5\%$.

25. The mineral wool as claimed in claim 6, wherein the $Fe_2O_3$ content is $5\% \leq Fe_2O_3 \leq 8\%$.

26. The mineral wool as claimed in claim 8, wherein ($Na_2O+K_2O$)/$Al_2O_3 \geq 0.7$.

27. The mineral wool as claimed in claim 9, wherein the CaO content is $15\% \leq CaO \leq 25\%$.

28. The mineral wool as claimed in claim 9, wherein the MgO content is $0\% \leq MgO \leq 2\%$.

29. The mineral wool as claimed in claim 9, wherein the MgO content is $0\% \leq MgO \leq 1\%$.

30. The mineral wool as claimed in claim 10, wherein the CaO content is $5\% \leq CaO \leq 10\%$.

31. A fire resistant structural system comprising the mineral wool as claimed in claim 1.

32. The mineral wool as claimed in claim 1, wherein the phosphorus compound is selected from polyphosphates, phosphoric acid in its various forms, or aluminum hydrogen phosphates.

33. The mineral wool as claimed in claim 1, wherein the phosphorus compound is mixed with an organic compound.

34. A process for manufacturing mineral wool, comprising forming a plurality of fibers from a molten oxide, wherein the molten oxide comprises $SiO_2$ in an amount of from 35 to 60%, $Al_2O_3$ in an amount of from 12 to 27%, CaO in an amount of from 0 to 35%, MgO in an amount of from 0 to 30%, $Na_2O$ in an amount of from 0 to 17%, $K_2O$ in an amount of from 0 to 17%, $R_2O$ ($Na_2O+K_2O$) in an amount of from 10 to 17%, $P_2O_5$ in an amount of from 0 to 5%, $Fe_2O_3$ in an amount of from 0 to 20%, $B_2O_3$ in an amount of from 0 to 8%, and $TiO_2$ in an amount of from 0 to 3%, and applying a phosphorus compound capable of reacting with the fibers to form a coating on the surface of the fibers, and wherein the phosphate compound is added in an amount that results in a phosphorus content, expressed in $P_2O_5$ form, from 0.2% to 5% of the total mass of fibers.

35. The process of claim 34, wherein the phosphorous compound is applied by spraying or impregnating with a solution.

36. The process of claim 34, wherein $SiO_2$ is present in an amount of from 39 to 55%, $Al_2O_3$ is present in an amount of from 16 to 25%, CaO is present in an amount of from 3 to 25%, MgO is present in an amount of from 0 to 15%, $Na_2O$ is present in an amount of from 6 to 12%, $K_2O$ is present in an amount of from 3 to 12%, $R_2O$ ($Na_2O+K_2O$) is present in an amount of from 12 to 17%, $P_2O_5$ is present in an amount of from 0 to 2%, and $B_2O_3$ is present in an amount of from 0 to 4%.

* * * * *